Aug. 14, 1923.
W. W. TEW
1,465,193
VEHICLE WHEEL
Filed Feb. 16, 1922  2 Sheets-Sheet 1
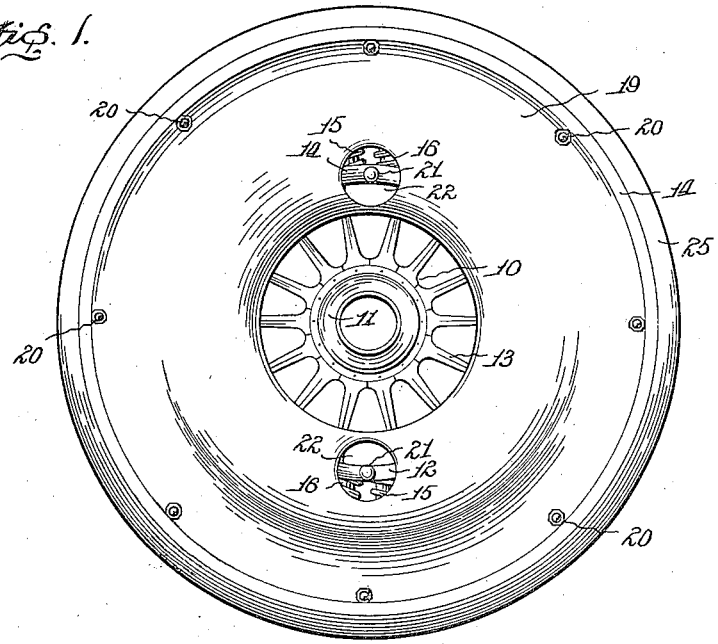
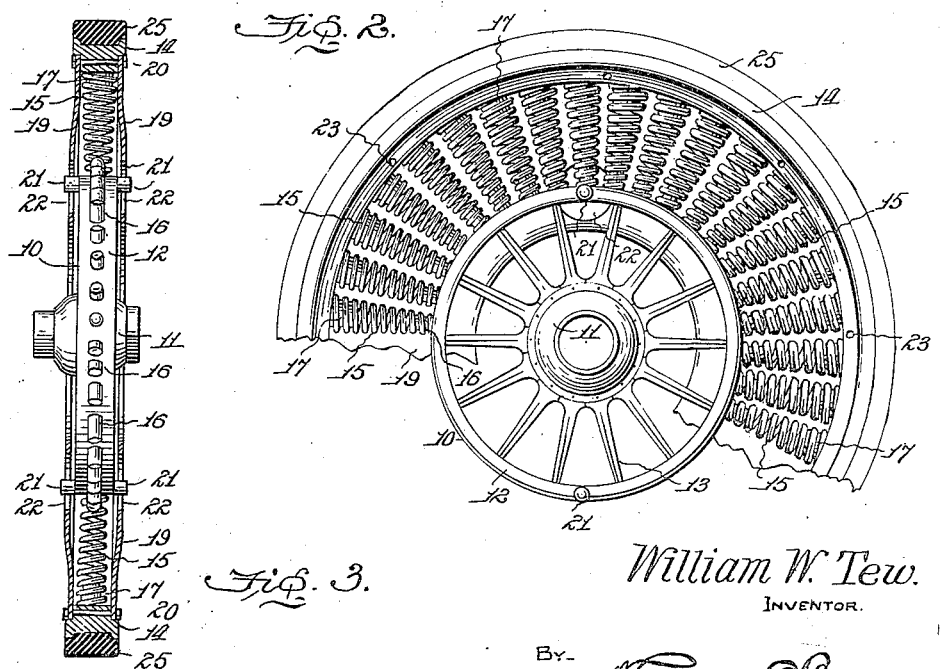
William W. Tew.
INVENTOR.

Aug. 14, 1923.

W. W. TEW

VEHICLE WHEEL

Filed Feb. 16, 1922

William W. Tew.
INVENTOR.

BY

ATTORNEY.

Patented Aug. 14, 1923.

1,465,193

UNITED STATES PATENT OFFICE.

WILLIAM W. TEW, OF BANKS, ALABAMA.

VEHICLE WHEEL.

Application filed February 16, 1922. Serial No. 536,992.

*To all whom it may concern:*

Be it known that I, WILLIAM W. TEW, a citizen of the United States, residing at Banks, in the county of Pike and State of Alabama, have invented a Vehicle Wheel, of which the following is a full and complete specification.

My invention is an improvement in vehicle wheels of that particular class in which a solid tire is employed and the required resiliency attained by means of springs interposed between non-flexible inner and outer rims.

In wheels of this type the springs are subjected to longitudinal and lateral strain during the travel of the vehicle over a road, and inasmuch as the outer rim section is yieldingly connected to the rim of the inner section mounted on the axle the stability of the wheel structure in general use depends upon the proper cooperation of said outer rim section with the other portions of the wheel to withstand the aforesaid strain both longitudinally and laterally, and of course in providing for this required stability the arrangement should not interfere with the resiliency of the wheel.

It is the main object of my invention, therefore, to provide a spring wheel which will be sufficiently resilient to provide for the easy running of the vehicle and in which any ordinary strain on the wheel structure, as for instance in starting the vehicle or in running the same over a rough roadway, will be taken care of effectively and in such manner that not only is the stability of the wheel accomplished but also the springs thereof fully protected as well as relieved of undue strain and consequent liability to injury; the functioning of the several parts for the purpose being attained by an arrangement that is simple, inexpensive and durable.

A further object of my invention is to provide a vehicle wheel of this character which is especially adapted for automobiles and motor vehicles and which has the appearance of an ordinary disk-wheel.

My invention consists mainly in providing a spring-wheel comprising an inner section or small main wheel and an outer section or tread portion, with springs interposed therebetween; combined with annular disks attached to one of said sections and overlapping the other section to provide for the rigidity of the wheel when it is subjected to lateral strain.

My invention further consists in providing means for cooperation with the annular disks and inner wheel section whereby a rigid connection is established to relieve the interposed springs from undue longitudinal strain in starting the vehicle under stress of a heavy load.

My invention further consists in the particular construction and arrangement of parts constituting the whole wheel structure, all as hereinafter fully described and specifically set forth in the appended claim.

In the accompanying drawings:—

Fig. 1 is a side view of a spring-wheel for vehicles constructed in accordance with my invention.

Fig. 2 is a similar view with the front plate or annular disk removed to show the arrangement of springs.

Fig. 3 is a vertical sectional view through the center of the wheel.

Fig. 9 is a detail hereinafter referred to.

Figure 4:
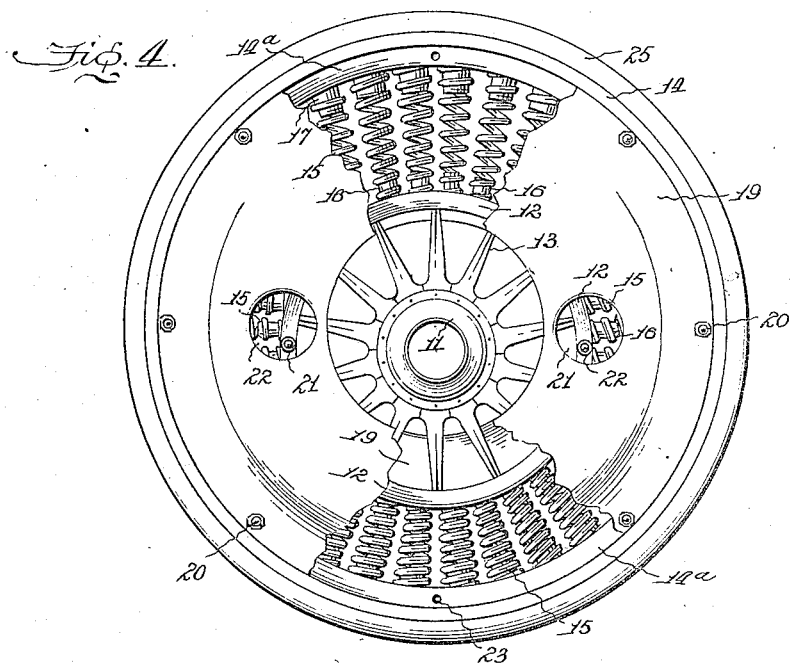
Fig. 4 is a side view illustrating the wheel as it appears in use, parts of the front disk being broken away to show the effect on the springs under this condition.

In carrying out my invention I provide an inner section 10, in the form of a small conventional wheel to be mounted for rotation on the axle and comprising a hub 11, rim 12 and spokes 13. As this inner section or wheel is used in connection with an outer section or tread portion having rim 14 the size of the same will depend upon the size of spring-wheel to be constructed and use to which it is to be put, and the diameter of the outer rim 14 is such with respect to the inner rim 12 as to provide an annular space between said rims to receive and permit the required action of a series of spiral springs 15 which provide for the resiliency of the wheel structure and are disposed radially between the rims, the annular space in the present instance—for a wheel for use in connection with an automobile—being about two-thirds the diameter of the inner section or small wheel 10. I prefer to use coiled springs in this annular space between the rims 12 and 14, and they are arranged close together to not only increase the strength of the wheel but also provide a maximum degree of resiliency. Any suitable means may be employed for connecting the ends of these spiral springs to the opposing rims 12 and 14, but a firm connection of both ends should be made to utilize the expansion of said springs at the upper portion of the wheel (Fig. 4) when those at the lower portion are under compression, and as an example I have in Figs. 5 to 8, inclusive, illustrated forms in which lugs are used to enter the opposite ends of the springs and provided with means for attaching said springs thereto; for instance the lug 16 projecting into the smaller end of the spring is provided with a boss 16$^c$ spaced from the rim 12 and undercut to receive the terminal portion of said spring; while the lug 17 at the inner side of the outer rim receiving the outer or larger end of the spring has a hole 18 at one side thereof in which engages the bent end 15$^a$ of said spring. The rims 12 and 14 are non-flexible, the resiliency of the wheel depending altogether upon the coiled springs permitting of the required spring movement between the inner and outer sections, and as the outer rim or tread section is turned by the inner section mounted on the axle, and vice versa, through the intervention of said springs the latter will be of sufficient strength in cooperating to turn said outer rim or tread section and also to compensate for any jars or jolts to which the wheel may be subjected in travelling over a rough road, in which latter instance the springs act as shock absorbers to a greater extent than the ordinary pneumatic-tired wheels. As hereinbefore stated I prefer to arrange the coiled springs close together and consequently they will be tapered, as shown in the drawings, the taper depending upon the width of the annular space between the inner and outer rims, and of course the lugs 16 and 17 will fit tightly into the ends of the springs so there will be no play at these points when said springs are subjected to the strain required of them in turning the outer rim.

In order to cover the springs 15 for protection, and mainly to limit lateral movement of the outer section of the wheel with respect to the inner section thereof I provide an annular disk 19 at each side of the wheel, said disks fitting in the recesses 14$^a$ at the inner edges of the rim 14, being secured to said rim by bolts 20, and embrace the rim 12 of the inner wheel section. The central portion of each disk is cut away centrally to a more or less extent for the required play of the hub 11 in the operation of the wheel, and in order to relieve said disks of unnecessary wear on account of the slight vertical and rotatable movement of the sections on each other when the vehicle is in motion the portions of the disks at opposite sides of the rim 12 are disposed normally a slight distance therefrom, whereby they will act to brace the wheel only when the latter is subjected to excessive lateral strain as for instance in turning the same from a straight course.

For the purpose of relieving the springs of undue strain in the direction of the momentum of the wheel or radially I provide means for rigidly connecting the two sections of the wheel together under such conditions where one section fails to turn the other easily, as for instance when the wheels are used in connection with a heavily loaded vehicle, and particularly in starting up such a vehicle. The means I employ consists in providing the rim 12 of the inner section of the wheel with projections 21, and the disks 19 carried by the other or outer section with circular openings 22 into which said projections extend and against the walls of which they engage during excessive radial movement of one wheel section on the other; the size of said circular openings being such as to not interfere with the normal movement of the sections on each other, being slightly larger than the path of travel of said projections in the openings under normal conditions.

Figure 9:
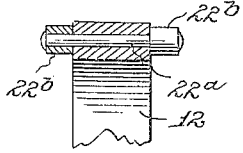
Figure 7:
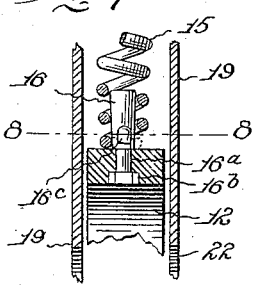
Fig. 7 is a sectional view through the rim of the inner section to show a connection for the inner end of the springs.
Figure 8:
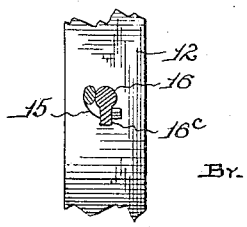
Fig. 8 is a sectional view on the line 8—8 Fig. 7.

When wooden rims are used the lugs are provided with stems, as 16$^a$ 17$^a$ respectively, to project through holes therefor in said rims and receive nuts, 16$^b$, 17$^b$. For the projections 21 on the rim 12, which cooperate with the circular openings 22 in the disks 19, I prefer to use rollers 22$^b$ (Fig. 9) mounted on a spindle 22$^a$ extending transversely through the rim. Furthermore, to secure the disks 19 to the outer rim 14 the bolts 20 may pass transversely through said rim, as shown in Fig. 3, for which purpose said rim is provided with holes 23. However, these and other details of construction may be modified without materially altering the practical construction and operation of my improved spring-wheel or avoiding the scope of the appended claim.

The operation of my improved wheel in connection with a vehicle will be readily understood from the foregoing description in connection with the accompanying drawings, for the load of the vehicle coming upon the wheels is supported by the inner and outer sections of the latter in combination with the interposed springs, and when the entire wheel revolves the springs at the lower portion thereof will be compressed and those at the upper portion expanded, while the intermediate springs will yield to a corresponding degree, so that practically all the springs come into play to provide a wheel structure of this kind that will possess the desired resiliency for the easy and comfortable running of the vehicle. In the present instance the disks not only serve to cover the springs and protect them, as well as give the wheel the appearance of an ordinary disk-wheel but said disks form the additional and more important functions of cooperating with the rim of the inner section of the wheel to prevent excessive movement both laterally and radially; thereby providing a spring-wheel that will possess the required stability in use. In other words, my improved wheel has a yielding spring movement between the non-flexible inner and outer rims for resiliency and at the same time provides for practically connecting said sections together rigidly when undue strain comes upon the wheel to exert extraordinary force either laterally or radially.

When the wheel is applied to an ordinary animal-drawn vehicle the inner section is turned by the outer section through the intervention of the coiled springs, and likewise when the wheel is applied as the front wheels of a motor-driven vehicle or automobile; but when applied as the rear or driving-wheels of an automobile the operation is reversed—the outer section being turned by the inner section. In applying the wheel to motor-vehicles it may be necessary to provide only the driving-wheels with the means, as projections 21 and openings 22, for rigidly connecting the sections to withstand radial strain.

Figure 5:
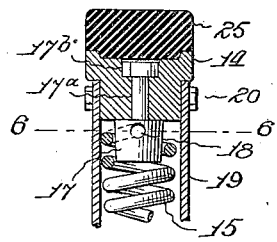
Fig. 5 is an enlarged sectional view through the outer portion of the wheel to show a connection for the springs.
Figure 6:
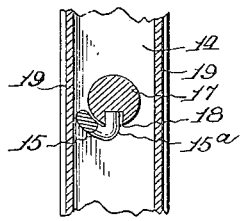
Fig. 6 is a sectional view on the line 6—6 of Fig. 5.

The outer rim 14 may be provided with any suitable tire, as for instance a solid rubber tire 25, as indicated in Fig. 5 of the drawings, and it will be understood that the relative sizes of the different parts will depend upon the use to which the wheel is to be put; that is whether it is built for an automobile, a truck, passenger-bus, etc.; but in each instance are only required to be stout enough to take care of the weight of the car and load, as in the present instance they will give far more spring or cushion effect than if required to be built rigid enough to withstand the lateral strain to which they are liable to be subjected in use. The bracing features of my improved spring wheel also prevent the pull of one section on the other from tearing the springs loose from the rims, this pull being principally on the rear wheels of a motor-driven vehicle and to a considerable degree in starting, especially when the vehicle is heavily loaded.

I will employ coiled springs in which the convolutions are normally separated to such an extent as to give expansibility when the springs are under compression at the lower part of the wheel and exert contraction when at the upper part of the wheel, but providing against the springs being pulled or stretched beyond their normal length to such an extent as to weaken their spring action.

Having described my invention, I claim:

A vehicle wheel comprising an inner main section having a hub, spokes and rim with inwardly-tapered lugs projecting outwardly from the rim each lug having a hooked projection at one side thereof; a supplemental rim with tire forming the outer section of the wheel and having inwardly projecting lugs each with a transverse hole therethrough, and coiled springs interposed between the aforesaid rims or sections of the wheel and tapered inwardly for close arrangement radially, the outer end of each spring engaging the hole in one of the aforesaid lugs on the outer wheel section and the contracted inner end of each spring closely embracing one of the aforesaid tapered lugs on the inner section of the wheel with the terminal thereof engaging the hook-projection; together with annular disks bolted to the outer wheel section and having circular openings therein on a plane with the rim of the inner section which they embrace, and rollers at the sides of the rim of said inner section projecting into said openings.

WILLIAM W. TEW.